H. K. SANDELL.
ELECTRIC MOTOR AND GOVERNING MECHANISM THEREFOR.
APPLICATION FILED JULY 14, 1917.
1,308,449.
Patented July 1, 1919.
3 SHEETS—SHEET 1.
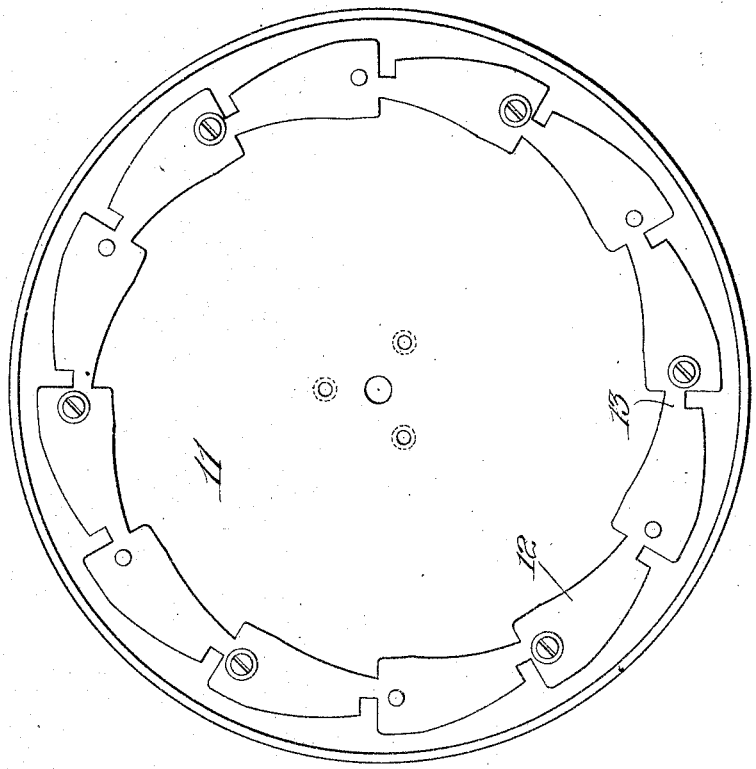
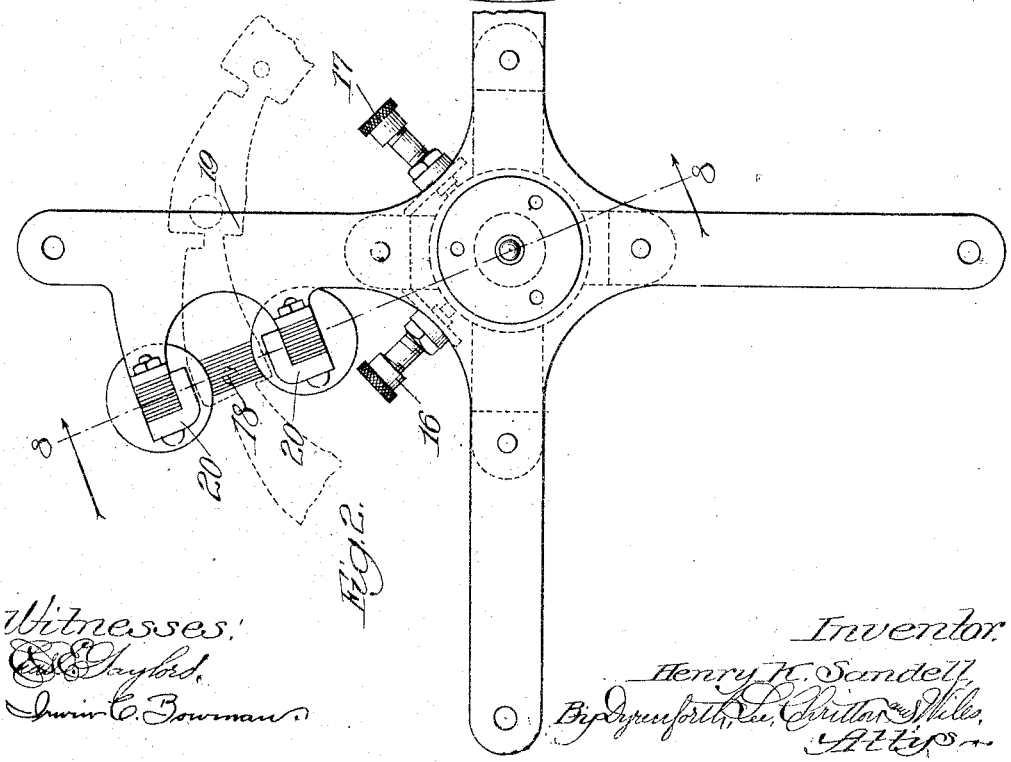

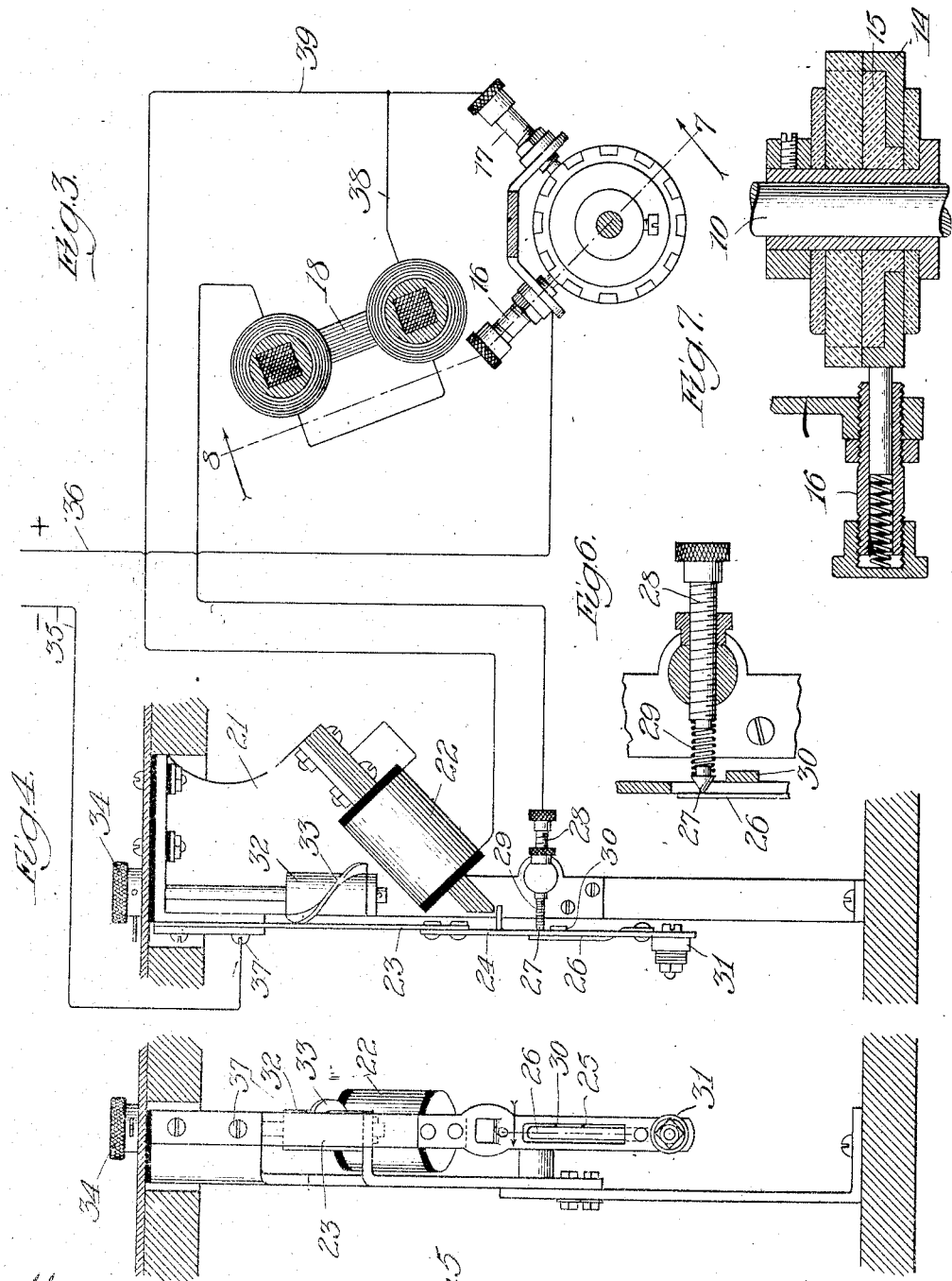

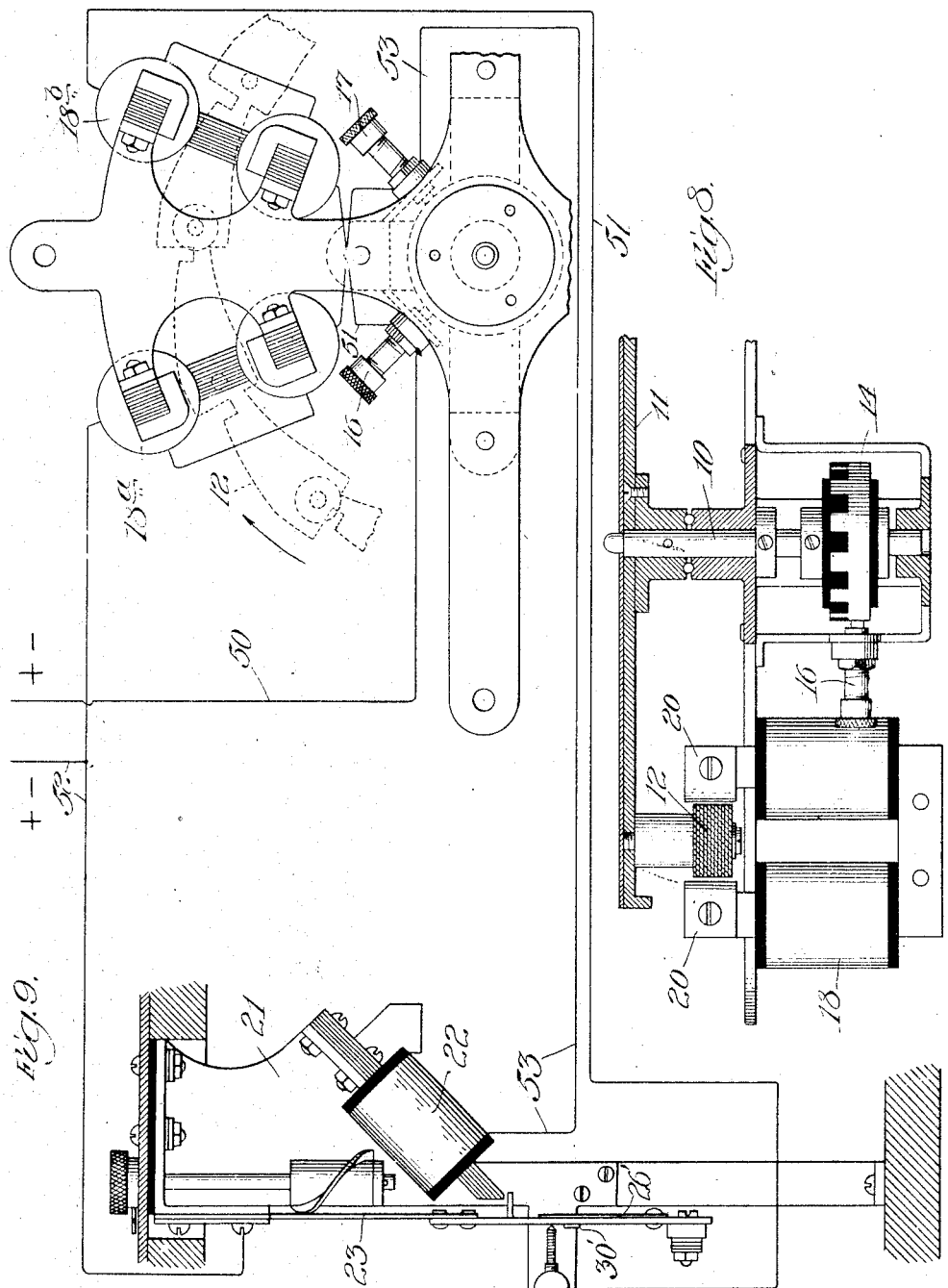

UNITED STATES PATENT OFFICE.

HENRY K. SANDELL, OF CHICAGO, ILLINOIS, ASSIGNOR TO HERBERT S. MILLS, OF CHICAGO, ILLINOIS.

ELECTRIC MOTOR AND GOVERNING MECHANISM THEREFOR.

1,308,449.    Specification of Letters Patent.    Patented July 1, 1919.

Application filed July 14, 1917. Serial No. 180,586.

*To all whom it may concern:*

Be it known that I, HENRY K. SANDELL, a citizen of the United States, residing at Chicago, in the county of Cook and State of Illinois, have invented a new and useful Improvement in Electric Motors and Governing Mechanism Therefor, of which the following is a specification.

My invention relates to improvements in electric motors and governing mechanism therefor. It is my specific object to provide a type of motor and governor especially designed for use in phonographs and the like mechanisms in which a low speed motor having very accurate regulation is desired.

The invention will be fully understood from the following detailed description of a specific embodiment thereof, taken in connection with the accompanying drawings, in which—

Figure 1 is a bottom plan view of the armature or rotor of my motor, the same being here illustrated as applied to the table of a phonograph making use of disk records; Fig. 2 is a top plan view of my motor with the rotor or armature removed, the motor here illustrated being designed for actuation by direct current; Fig. 3 is a sectional view through the magnets of the motor shown in Fig. 2 and illustrating the commutator in plan view; Fig. 4 is a section through the supporting casing of the motor illustrating the governor in side elevation (Figs. 3 and 4 are connected to constitute together a wiring diagram of the motor); Fig. 5 is an end view of the governor mechanism shown in Fig. 4; Fig. 6 is an enlarged section through the contact screw of the governor taken on the line 6 of Fig. 5; Fig. 7 is a vertical sectional view through the commutator, taken on the line 7 of Fig. 3; Fig. 8 is a sectional elevation on the line 7—8, of Fig. 3, and Fig. 9 is a composite view similar to Figs. 3 and 4 and illustrating the modifications in construction adapted for the use of alternating currents.

Referring more particularly to the drawings, the numeral 10 designates the rotor shaft which, in the present instance, constitutes the table shaft of the phonograph, this table shaft bearing a disk or table 11 which is secured against rotation thereon by any suitable means, one manner of mounting being illustrated in Fig. 8. Secured to the lower face of the table 11 and spaced therefrom, as shown in Fig. 8, is a laminated ring 12 formed of magnetic metal and preferably of the configuration shown in Fig. 1, that is, comprising a plurality of tapering sections joined by relatively thin necks 13.

The lower portion of the shaft 10 carries a commutator or interrupter comprising a metallic ring 14 suitably secured upon an insulating center 15 and having a castellated upper edge, the spaces between the teeth of which are filled up flush by the insulation 15. For coöperating with the commutator surface formed by the ring 14, I have provided brushes 16, 17, the brush 16 being mounted at such horizontal level as to continuously bear upon the unbroken surface of the ring 14, while the brush 17 bears upon the toothed or castellated upper edge of the ring. In this manner the electrical circuit between the two brushes is continuously interrupted and reformed at regularly timed intervals.

The actuating magnet of the motor is designated 18 and is mounted upon one arm of a spider 19 which serves as the frame of the motor and which is mounted in a suitable case, in the present instance in the case or cabinet of the phonograph. The magnet 18 is of U-shape, the core being of laminated steel and each leg being provided with a spool winding. The pole pieces 20 are supported in a horizontal plane to straddle the armature ring 12, the distance between the pole pieces slightly exceeding the greatest width of the ring sections as illustrated in Fig. 8.

The governor mechanism which is illustrated in detail in Figs. 4, 5 and 6, is supported by a plate 21 which is in turn mounted in any suitable fashion in the cabinet of the machine and comprises essentially an operating magnet 22 and a vibrating leaf 23. The laminated pole piece of the magnet is secured to the plate 21 (which is preferably of magnetic metal) at one end, the vibrating leaf 23 (which is also preferably of magnetic metal) is supported at the top from the same plate and intermediate its length has secured thereto a heavier section 24 which constitutes the armature for the magnet 22. The outer end of the armature section 24 of the vibratory leaf is slotted as shown at 25 in Fig. 5, and in the slot there is secured a contact spring 26 the free upper end of which normally engages the tip 27 of an adjustable contact screw 28, this tip being itself supported by a small helical spring 29 which forms an extension of the contact screw. The contact spring 26 has a permanent set which tends to throw its free end to the right, as viewed in Fig. 6, and into engagement with the spring-held end of the contact screw. The movement of the spring contact 26 in this direction is (when not arrested by the contact screw itself) limited by a stop 30 bridging the slot 25 and secured to the vibratory armature section 24.

The period of vibration of the leaf made up of the upper section 23 and the armature section 24 is regulated by weighting the free end of the armature 24, as shown at 31 in the drawings as an initial adjustment, and by the provision of a rotatable cylinder 32 carrying a helical fin 33 which contacts with the vibratory leaf adjacent its fixed end as shown in Fig. 4. An adjustment knob 34 secured to the shaft which bears the cylinder 32 provides a convenient means for fixing the angular position of the cylinder and of the fin thereon and by thus varying the effective length of the vibratory leaf, proportionately altering its periodic time.

The apparatus described above, is connected as shown in Figs. 3 and 4. The connections comprise direct current service lines designated 35 and 36, respectively, the former of which is directly connected to the plate 21 as shown at 37, and thereby with the contact spring 26. The service line 26 leads to the brush 16, while from the opposite brush 17 the current flow in branch circuits 38 and 39, through the magnet 18 and to the contact screw 28 and through the magnet 22 and to the plate 21 to which it is grounded, respectively.

The operation of the motor is as follows: Assuming that the service lines 35, 36, are energized and that the commutator ring 14 is in a position to close the circuit between the brushes 16 and 17, current will flow through the motor magnet 18, through the insulated contact screw 28 and thence through the spring contact 26 and vibratory leaf to the other line wire 35. Simultaneously, the current will also energize the governor magnet 22. The angular relation of the armature or rotor ring 12 to the commutator ring 14 is such that when the circuit is first closed through the latter, the tapering portions of one of the sections of the rotor 12 will lie between the pole pieces 20 of the motor magnet. By reason of the tractive force exerted by the magnet upon the rotor section, the latter will be drawn in a counter-clockwise direction as viewed in Fig. 1, the width of the commutator teeth on the ring 14 being sufficient to permit the rotor to move until the base or large end of each section of the ring 12 lies between the poles 20 before the commutator circuit is opened. Through the momentum gained by this initial movement the rotor or armature will continue to move during the period in which the commutator circuit and hence the circuit of the motor magnet 18 is interrupted by one of the insulating sections, and during this period the base end of the section which lies between the pole pieces will move out of the same and the tapering end of the next adjacent section will move between the pole pieces. The circuit through the motor magnet 18 will now be reëstablished by the commutator and a further impulse of like duration will be imparted to the rotor or armature. It will be noted from the above that the proper design of the parts requires the teeth of the commutator ring 14 to be equal in number to the sections of the rotor 12 and to have a proper angular relation thereto.

In the operation as so far described, it has been assumed that the energizing circuit for the motor magnets 18 was interrupted only by the commutator ring 14. In fact, however, this energizing circuit passes not only through the commutator but through the contact spring 26 of the vibrating leaf 23 by means of the contact screw 28. It therefore follows that the energizing circuit of the motor magnets 18 will be opened during whatever period of time the contact spring 26 recedes from the point of the contact screw 28. Since the governor magnet 22 which attracts the armature section 24 of the vibratory leaf 23 is in series only with the commutator 14, this magnet will be unfailingly energized synchronously with the movement of the commutator. As was before stated the contact spring 26 is normally in engagement with the end of the contact screw 28 and the force of attraction exerted upon the vibratory leaf through its armature end 24 will therefore serve to initially increase the contact pressure between the parts 26 and 27, maintaining the circuit through these parts closed. Upon the opening of the commutator circuit, however, the magnet 22 becomes deënergized and by the resiliency of the leaf 23 as well as the slight force exerted by the parts 26, 27, the leaf will swing away from the contact screw 28, and, the amplitude of the motion being sufficient, contact will be broken between the parts 26, 27, the limit stop 30 for the contact spring 26 permitting this separation. The interval of time during which the vibratory leaf 23 will remain in its outer position thus opening the circuit at the points 26, 27, is determined by the periodic time of vibration of the leaf and by the construction illustrated. This physical constant is made the controlling factor determining the speed of the rotor 12. When the rotor first begins to move, that is, when its speed is below the predetermined speed of operation, the vibratory leaf 23 will complete its outward swing and will return and remain in contact with the contact screw 28 before the commutator has moved through the angular distance of one of the insulating segments thereon. Promptly upon the completion of the required movement of the commutator the motor magnet 18 will therefore be energized and will remain energized until the circuit is again interrupted by the commutator. The rotor 12 will therefore receive a full impulse, the power of which will be sufficient to accelerate it and bring it quickly up to the predetermined speed. As further acceleration tends to increase the rotor speed beyond this limit, the actual interval of time between successive impulses proportionately decreases until at a critical value of this time interval the commutator has reestablished the circuit between the brushes 16, 17, before the vibratory leaf 23 has completed its outward and inward swing. As a consequence of this situation, the circuit is held open between the points 26, 27 during a part of the time in which the rotor 12 should have received an impulse. In effect, therefore, the actuating force is reduced and the rotor tends to drop to the normal speed. It will readily be understood that the regulating effect exerted by the vibratory leaf 23 is directly proportional to the variation from normal speed of the rotor 12. On the one side a very low speed of the rotor will maintain the points 26, 27, in contact through the whole of the period in which the circuit is closed by the commutator 14 and the maximum tractive effort will be exerted upon the rotor. On the other side, a sufficiently high speed of the rotor 12 will cause the contact points 26, 27, to remain open during the entire period in which the circuit is closed by the commutator and no tractive effort whatever will be exerted upon the rotor.

In practice the regulation obtainable through the governing device described is exceedingly accurate. The variation in speed between the motor, for example, a phonograph motor running idle and the same motor running under the maximum load provided by the largest record and with the needle in engagement with the same at the greatest possible distance from the center is negligible. Furthermore, this predetermined speed is simply and accurately controlled through the adjustment of the effective length and hence of the natural periodic time of the leaf 23 by means of the helical rib 33.

In Fig. 9 I have illustrated a modification of my motor and governor particularly designed for use with alternating currents. The construction here illustrated is identical with that heretofore described save in the following particulars:

The contact screw here designated 28' is mounted upon the opposite side of the vibrating leaf 23 and the contact spring and stop therefor, here designated 26' and 30', respectively, are reversed as required by the altered position of the contact screw. In place of the single motor magnet 18 there is also provided a pair of motor magnets one of which, designated $18^a$, I call the running magnet, and the other of which, designated $18^b$, will be referred to as the regulating magnet.

The electrical connections for the alternating current device illustrated in Fig. 9 are as follows:

One of the service lines 50 is led directly to the brush 16 and from this same brush a line 51 leads to the regulating magnet $18^b$ and through the latter to the contact screw 28'. The other service line 52 is connected on one side to the frame which supports the leaf 23 and on the other side to the running magnet $18^a$ and through the latter with the brush 17. A second lead 53 attached to the brush 17 is connected with the governor magnet 22 being grounded through the latter to its frame as in the preceding instance.

It will be observed that by connecting the parts in this manner the running magnet $18^a$ is at all times in series with the service lines through the commutator only, the service line 50 being connected to the brush 15 and the service line 52 through the magnet $18^a$ directly with the brush 17. The energizing and deënergizing of the running magnet $18^a$ is therefore solely dependent upon the commutator and the entire regulating effect is obtained through the magnet $18^b$. This magnet must therefore operate to retard the rotor 12 when the latter tends to exceed its predetermined speed and accelerate the rotor when the latter drops below its predetermined speed. This effect is obtained by the governing device illustrated in the following manner:

Assuming that the rotor 12 is moving at a speed lower than its predetermined speed and that the rotor has reached the position with reference to the magnet $18^a$ which is illustrated in Fig. 9, the circuit through this magnet will now be interrupted by the commutator. Simultaneously, the circuit through the governor magnet 22 which has during the preceding interval been energized and therefore attracting the leaf 23 and opening the circuit between the points 28' and 26', will be deënergized and through its resiliency the leaf 23 will swing to the left as viewed in Fig. 9, thus bringing the points 26', 28', into engagement and closing the circuit through the regulating magnet 18ᵇ. As is shown in the figure, this latter magnet is spaced from the running magnet by an annular distance equal to about 1¼ times the length of one of the sections of the rotor 12. At the moment when the circuit is interrupted by the commutator, this regulating magnet is therefore in such position with reference to the rotor as to exert a pull upon the rotor tending to accelerate its speed in the direction in which it is operating. Through the closing of the circuit at the points 28′, 26′, as above described, the regulating magnet is therefore energized to accelerate the rotor. The period during which such accelerating effect is exercised is dependent upon the periodic time of the leaf 23 being that time which is required for this leaf to complete its swing from an approximately central point, as illustrated on the drawing, to the extreme left and back to the same point. The contact screw 28′ should be so adjusted as to make contact with the spring 26′ with the initial left-hand swing of the latter from its central position shown. This contact is, of course, maintained through the yielding of the spring 26′ during the further outward vibration of the leaf 23. At any speed of the rotor 12 less than the predetermined speed thereof, the regulating magnet 18ᵇ will be energized during that period required for the rotor section to move from the position in which it is shown in Fig. 9, until its base lies between the pole pieces of the magnet. At this latter time the leaf 23 will have completed its left-hand swing and will have again opened the circuit at the points 28′, 26′.

If it be assumed, however, that the rotor is traveling at a speed in excess of the predetermined speed, then the time interval required for the passage of the rotor section between the poles of the regulating magnet 18ᵇ, will be less than the time required by the leaf 23 for the completion of its left-hand swing. As a result the circuit will not be opened between the points 28′, 26′, when the base of the rotor section reaches the pole pieces but will remain closed for some further period during which time the base or larger end of the rotor section is receding from the pole pieces. During this last period of time the energized regulating magnet 18ᵇ will be exercising a counter-clockwise pull upon the rotor, that is, tending to retard the same.

From the foregoing it will be seen that accordingly as the rotor travels at a speed less than or greater than the predetermined speed, the regulating magnet 18ᵇ will exert an accelerating or retarding effect, that is, it will either assist the running magnet 18ᵃ by operating upon the rotor sections in the same direction or by tending to pull them in a reverse direction. It will further be seen that the regulation here afforded is likewise a function of the periodic time of the vibratory leaf 23 and capable of adjustment or variation in the simple manner described in connection with the direct current motor.

Although I have specifically described the construction of Fig. 9 as being intended for use with alternating currents, it is to be understood that this construction is equally useful with direct current, there being no difference whatever in the operation. The mechanism illustrated in Figs. 1 to 8, however, is somewhat simpler and is found to be entirely satisfactory for use with direct currents. The construction of Fig. 9, while somewhat more complicated, is of universal application, taking either direct current or alternating current of any usual frequency.

Both the motor and the governing device above described is of particular service as a driving means for the table of the phonograph by reason of the fact that it readily lends itself to the driving of the table of the latter directly and without the interposition of any gearing. The noise and vibration which almost inevitably accompanies the use of reduction gearing is thereby eliminated. The motor and governing device illustrated is entirely noiseless in operation, the details of the governor in particular having been specifically designed with this end in view.

While I have described in considerable detail a specific embodiment of my invention, it is to be understood that this is illustrative only and for the purpose of making the invention more clear and that I do not regard the invention as limited to the details shown or described; except in so far as such limitations are included within the terms of the accompanying claims, in which it is my intention to claim all novelty inherent in my invention as broadly as is permissible in view of the prior art.

What I claim as new and desire to secure by Letters Patent, is:—

1. A motor comprising a plurality of magnetic metal sections arranged in a circle to constitute a rotatable armature, an electromagnet arranged in operative relation to the said armature, a current-interrupting device in series with the said electromagnet and synchronously driven from the said armature and a second circuit-interrupting device in series with said first device comprising a contact member having a reciprocatory movement of determined periodicity.

2. A motor comprising a plurality of sections of magnetic metal arranged in the form of a circular armature, an electromagnet in operative relation to the said armature, a current-interrupting device operating synchronously with the said armature and in series with the said electromagnet for controlling the same, a second electromagnet angularly spaced from said first magnet by a distance greater than the angular amplitude of one of said armature sections and less than the angular amplitude of two of said sections, and a second current-interrupting device in series with said second electromagnet and operating synchronously with said armature and additional time controlled means for governing said second interrupter.

3. A motor comprising a plurality of magnetic metal sections arranged in a circle to constitute a rotatable armature, an electromagnet arranged in operative relation to the said armature, a current-interrupting device in series with the said electromagnet and synchronously driven from the said armature, a second circuit-interrupting device in series with said first device and comprising a vibratory element and contact mechanism held closed by said vibratory element during a part of its motion and open during a part of its motion, and means operating synchronously with said armature for vibrating said vibratory element.

4. A motor comprising a plurality of magnetic metal sections arranged in a circle to constitute a rotatable armature, an electromagnet arranged in operative relation to the said armature, a current-interrupting device in series with the said electromagnet and synchronously driven from the said armature, a second circuit-interrupting device in series with said first device and comprising a vibratory element and contact mechanism held closed by said vibratory element during a part of its motion and open during a part of its motion, and electromagnetic means in series with said first-named circuit interrupter causing vibration of said vibratory element.

5. In combination with a motor comprising a plurality of magnetic sections arranged in a circle to constitute a rotatable armature, an electromagnet in operative relation therewith and a current interrupting device rotatable synchronously with said armature and in series with said electromagnet, a second current interrupting device in series with the first comprising a vibratory element, contact mechanism engaged thereby during part of its movement, and means for effecting its vibration and a rotatable member having a helical fin engaging with said vibratory member and determining the effective length thereof.

6. A motor comprising a plurality of magnetic sections arranged in a circle to constitute a rotatable armature, an electromagnet arranged in operative relation to the said armature, a current-interrupting device in series with said electromagnet and synchronously driven from the said armature, a second electromagnet in operative relation to said the armature, and current-interrupting means in series with said second electromagnet, comprising a contact member having a reciprocatory movement of determined periodicity.

7. A motor comprising a plurality of magnetic metal sections arranged in a circle to constitute a rotatable armature, an electromagnet arranged in operative relation to the said armature, a current-interrupting device in series with the said electromagnet and synchronously driven from the said armature, a second current-interrupting device comprising an electromagnet in series with said first interrupting device and in operative relation to the vibratory element, an additional electromagnet in operative relation to said armature, and contact mechanism in series with said additional electromagnet and held open by said vibratory element during a part of its motion and closed during a part of its motion.

8. A motor comprising a disk-shaped table having a plurality of magnetic metal sections arranged in a circle on its lower face to constitute a rotatable armature, an electromagnet arranged in operative relation to the said armature, a current-interrupting device in series with the said electromagnet and synchronously driven from the shaft of the said table, a second electromagnet in series with said current-interrupting device, a vibratory leaf in operative relation to said second electromagnet, contact mechanism operable by movement of said leaf and held in closed position during a part of the motion of the leaf and in open position during a part of the motion of the leaf, means for varying the periodic time of the said leaf, and an additional electromagnet mounted in operative relation to the said armature and in series with the said contact mechanism.

HENRY K. SANDELL,